US011755522B1

(12) United States Patent
Hu et al.

(10) Patent No.: US 11,755,522 B1
(45) Date of Patent: Sep. 12, 2023

(54) METHOD, ELECTRONIC DEVICE, AND COMPUTER PROGRAM PRODUCT FOR IMPLEMENTING BLOCKCHAIN SYSTEM ON SWITCH

(71) Applicant: Dell Products L.P., Round Rock, TX (US)

(72) Inventors: Chenxi Hu, Beijing (CN); Sanping Li, Beijing (CN); Zhen Jia, Shanghai (CN); Anzhou Hou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/859,315

(22) Filed: Jul. 7, 2022

(30) Foreign Application Priority Data

Jun. 10, 2022 (CN) .......................... 202210658269.3

(51) Int. Cl.
*G06F 13/40* (2006.01)
*H04L 9/00* (2022.01)

(52) U.S. Cl.
CPC ............ *G06F 13/4022* (2013.01); *H04L 9/50* (2022.05)

(58) Field of Classification Search
CPC ....... G06F 13/4022; H04L 9/50; H04L 41/28; H04L 65/65; H04L 12/44; H04L 41/08; H04L 41/0895; H04L 63/00
USPC ................... 713/153; 370/254; 709/219, 224
See application file for complete search history.

(56) References Cited

U.S. PATENT DOCUMENTS

| 6,813,267 | B1 * | 11/2004 | Clayton | .............. H04L 12/1881 370/414 |
| 7,209,476 | B1 * | 4/2007 | Colloff | .................. H04L 49/208 370/360 |
| 8,081,629 | B2 * | 12/2011 | Miller | ..................... H04L 47/29 370/392 |
| 8,861,400 | B2 * | 10/2014 | Angst | .................. H04L 12/185 370/254 |
| 9,112,708 | B1 * | 8/2015 | Arad | ...................... H04L 49/901 |
| 9,838,327 | B1 * | 12/2017 | Ghosh | ................. F04D 27/0223 |

(Continued)

OTHER PUBLICATIONS

Intel Corporation, "Intel Intelligent Fabric Processors," https://www.intel.com/content/www/us/en/products/network-io/programmable-ethernet-switch.html, Accessed Dec. 21, 2021, 6 pages.

*Primary Examiner* — Faisal M Zaman
(74) *Attorney, Agent, or Firm* — Ryan, Mason & Lewis, LLP (57) ABSTRACT

Embodiments of the present disclosure relate to a method, an electronic device, and a computer program product for implementing a blockchain system on a switch. The method includes establishing a first blockchain node and a second blockchain node on the switch, where the first blockchain node includes a first ingress port and a first egress port, and the second blockchain node includes a second ingress port and a second egress port. The method further includes receiving a broadcast or multicast request from a user device through a user port of the switch. The method further includes sending the broadcast or multicast request to the first ingress port of the first blockchain node and the second ingress port of the second blockchain node. Through the embodiments of the present disclosure, a blockchain system can be implemented on a switch, so as to reduce the latency of the blockchain system.

20 Claims, 8 Drawing Sheets

(56) References Cited

U.S. PATENT DOCUMENTS

| | | | |
|---|---|---|---|
| 11,665,067 B2 * | 5/2023 | Pavlovic | H04L 41/042 |
| | | | 709/224 |
| 2002/0122386 A1 * | 9/2002 | Calvignac | H04L 12/5601 |
| | | | 370/232 |
| 2003/0074473 A1 * | 4/2003 | Pham | H04L 9/40 |
| | | | 709/230 |
| 2005/0195816 A1 * | 9/2005 | Sumiyoshi | H04L 12/18 |
| | | | 370/390 |
| 2019/0363938 A1 * | 11/2019 | Liebinger Portela | H04L 41/12 |
| 2019/0387035 A1 * | 12/2019 | Lee | H04L 65/65 |
| 2021/0058260 A1 * | 2/2021 | Xia | H04L 45/04 |
| 2021/0233672 A1 * | 7/2021 | Patil | H04W 4/70 |
| 2022/0329411 A1 * | 10/2022 | Kodeswaran | H04L 9/0643 |
| 2023/0081985 A1 * | 3/2023 | Lei | H04W 72/30 |
| | | | 370/312 |

* cited by examiner

METHOD, ELECTRONIC DEVICE, AND COMPUTER PROGRAM PRODUCT FOR IMPLEMENTING BLOCKCHAIN SYSTEM ON SWITCH

RELATED APPLICATION(S)

The present application claims priority to Chinese Patent Application No. 202210658269.3, filed Jun. 10, 2022, and entitled "Method, Electronic Device, And Computer Program Product for Implementing Blockchain System on Switch," which is incorporated by reference herein in its entirety.

FIELD

Embodiments of the present disclosure relate to the field of computers, and more particularly, to a method, an electronic device, and a computer program product for implementing a blockchain system on a switch.

BACKGROUND

A switch may include, for example, a bus and an internal switching matrix, with each port of the switch being attached to the bus. In some arrangements of this type, after a control circuit receives a packet, a processing port may search an address mapping table to determine a destination address and quickly transmit the packet to a destination port through the internal switching matrix. A programmable switch may program a programmable chip in the switch to achieve a customized function.

A blockchain technology uses a blockchain data structure to verify and store data, uses a distributed node consensus algorithm to generate and update data, and uses cryptography to ensure the security of data transmission and access. Blocks are generally stored and computed in a cloud. A user request for a blockchain needs to be routed to the cloud by an edge device (e.g., a switch) in a network. Therefore, there is a certain latency.

SUMMARY

Embodiments of the present disclosure provide a method, an electronic device, and a computer program product for implementing a blockchain system on a switch.

According to a first aspect of the present disclosure, a method for implementing a blockchain system on a switch is provided. The method includes establishing a first blockchain node and a second blockchain node on the switch, where the first blockchain node includes a first ingress port and a first egress port, and the second blockchain node includes a second ingress port and a second egress port. The method further includes receiving a broadcast or multicast request from a user device through a user port of the switch. The method further includes sending the broadcast or multicast request to the first ingress port of the first blockchain node and the second ingress port of the second blockchain node.

According to a second aspect of the present disclosure, a switch is provided. The switch includes a processing unit and a memory. The memory is coupled to the processing unit and stores instructions. The instructions, when executed by the processing unit, cause the switch to perform actions. The actions include establishing a first blockchain node and a second blockchain node on the switch, where the first blockchain node includes a first ingress port and a first egress port, and the second blockchain node includes a second ingress port and a second egress port. The actions further include receiving a broadcast or multicast request from a user device through a user port of the switch. The actions further include sending the broadcast or multicast request to the first ingress port of the first blockchain node and the second ingress port of the second blockchain node.

According to a third aspect of the present disclosure, a computer program product is provided. The computer program product is tangibly stored on a non-transitory computer-readable medium and includes computer-executable instructions, wherein the computer-executable instructions, when executed by a device, cause the device to perform the method according to the first aspect.

This Summary is provided to introduce the selection of concepts in a simplified form, which will be further described in the Detailed Description below. The Summary is neither intended to identify key features or principal features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar drawing marks represent identical or similar elements, in which.

In all the accompanying drawings, identical or similar reference numerals indicate identical or similar elements.

DETAILED DESCRIPTION

Illustrative embodiments of the present disclosure will be described in more detail below with reference to the accompanying drawings. Although the drawings show some embodiments of the present disclosure, it should be understood that the present disclosure can be implemented in various forms, and should not be construed as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In addition, all specific numerical values herein are examples, which are provided only to aid understanding, and are not intended to limit the scope.

Due to limitations of computing resources and network resources, a blockchain system generally has a large latency, which may affect a speed at which transaction data is processed. In addition, in a blockchain system implemented on a conventional cloud platform, if blockchain nodes are to be added, it will take a long time to synchronize data. Data size and network speed are both factors affecting data synchronization. Typically, it takes a lot of time to transmit data between blockchain nodes. As the data is transmitted between the blockchain nodes, a network protocol needs to be parsed for each packet, and it also takes time to encapsulate and decapsulate the packet. Conventionally, the transaction data is uploaded by a user from a user device to a cloud, processed in the cloud, and then transmitted back to the user device. Therefore, it is important to reduce the latency. In addition, another problem is that cloud computing resources are expensive, and as user scale and transaction data increase, more and more cloud computing demands cannot be met.

In order to solve the above shortcomings, embodiments of the present disclosure provide a solution for implementing a blockchain system on a switch. The multi-port parallel processing capability of the switch is used to process multiple requests in parallel to provide a data throughput. Thus, the switch can be used to process transaction data directly and thus reduce the latency and provide high-speed data transmission.

Figure 1:
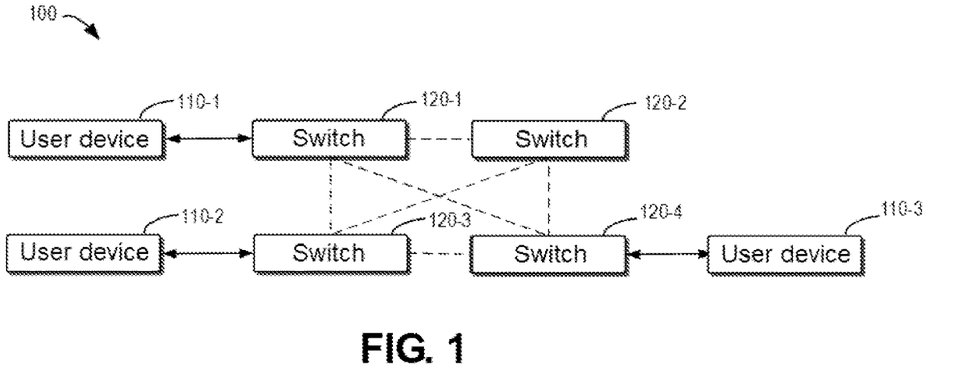
FIG. 1 is a schematic diagram of an example environment in which an embodiment of the present disclosure may be implemented.

FIG. 1 is a schematic diagram of example environment 100 in which an embodiment of the present disclosure may be implemented.

As shown in FIG. 1, example environment 100 includes user device 110-1, user device 110-2, and user device 110-3 (collectively or separately referred to as user device 110). User device 110 is operated by users. As an example only, user device 110 may be a personal computer.

Environment 100 further includes switch 120-1, switch 120-2, switch 120-3, and switch 120-4 (collectively or separately referred to as switch 120). Blockchain nodes may be configured on switches 120, and switches 120 may be communicatively interconnected. One user device of user devices 110 may be communicatively connected to one switch of switches 120. It should be understood that, as an example, environment 100 may include any number of user devices and any number of switches. Each switch is provided with a plurality of blockchain nodes, and the plurality of switches connected make up a blockchain system.

It should be understood that the architecture and functions of example environment 100 are described for illustrative purposes only, without implying any limitation to the scope of the present disclosure. Embodiments of the present disclosure may also be applied to other environments having different structures and/or functions.

A process according to an embodiment of the present disclosure will be described in detail below with reference to FIG. 2 to FIG. 5E. For ease of understanding, the specific data mentioned in the following description are all illustrative and are not intended to limit the scope of protection of the present disclosure. It should be understood that the embodiment described below may also include additional actions not shown and/or may omit actions shown, and the scope of the present disclosure is not limited in this regard.

Figure 2:
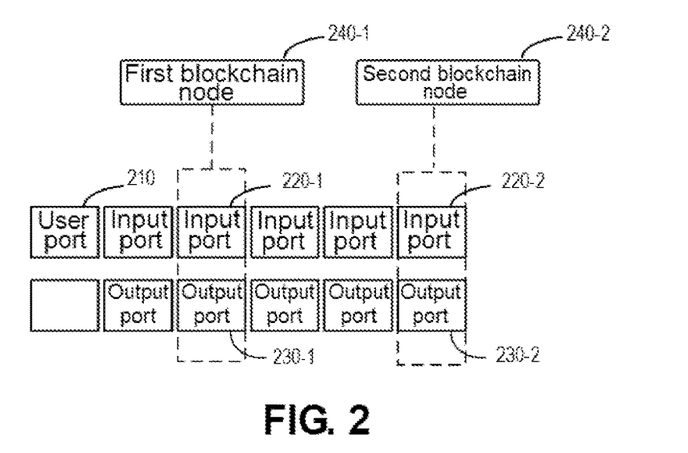
FIG. 2 is a schematic diagram of a switch according to an example implementation of the present disclosure.

FIG. 2 shows a schematic diagram of switch 120 according to an example implementation of the present disclosure.

As shown in FIG. 2, switch 120 may have a plurality of ports, where one port may be configured to be connected to user device 110. The port may be referred to as user port 210. A request from user device 110 may be received by switch 120 via user port 210.

Switch 120 further includes a plurality of other ports. Such a plurality of ports may be configured as a plurality of input ports (also referred to herein as "ingress ports"), and a plurality of output ports (also referred to herein as "egress ports"). For example, first input port 220-1 and first output port 230-1 may be configured to be logically connected to first blockchain node 240-1 in the blockchain system. Second input port 220-2 and second output port 230-2 may be configured to be logically connected to second blockchain node 240-2 in the blockchain system. Blockchain nodes may communicate with other blockchain nodes via the input ports and the output ports.

Figure 3:
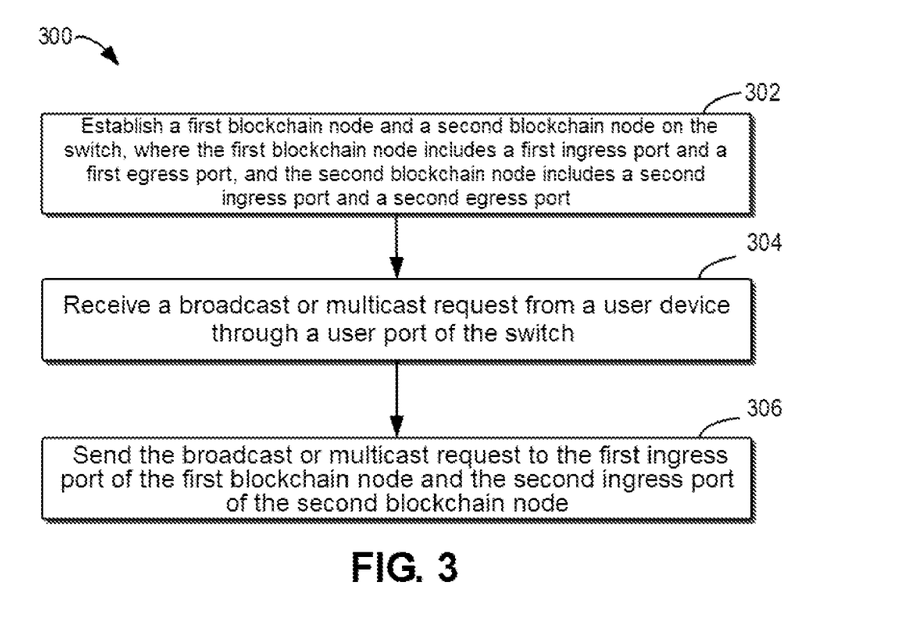
FIG. 3 is a flow chart illustrating a method for implementing a blockchain system on a switch according to an example implementation of the present disclosure.

FIG. 3 shows a flow chart of method 300 for implementing a blockchain system on a switch according to an example implementation of the present disclosure.

At block 302, a first blockchain node and a second blockchain node are established on the switch, where the first blockchain node includes a first ingress port and a first egress port, and the second blockchain node includes a second ingress port and a second egress port. For example, first blockchain node 240-1 and second blockchain node 240-2 are established on switch 120, where the first blockchain node includes first ingress port 220-1 and first egress port 230-1, and the second blockchain node includes second ingress port 220-2 and second egress port 230-2.

At block 304, a broadcast or multicast request is received from a user device through a user port of the switch. For example, a broadcast request is received from user device 110 through user port 210 of switch 120.

At block 306, the broadcast or multicast request is sent to the first ingress port of the first blockchain node and the second ingress port of the second blockchain node. For example, the broadcast request is sent to first ingress port 220-1 of first blockchain node 240-1 and second ingress port 220-2 of second blockchain node 240-2.

By performing method 300, the functions of the blockchain nodes can be implemented directly on the switch without the need to upload requests to the cloud, thus reducing the latency and providing high-speed data transmission. In addition, because the switch includes a plurality of ports, many concurrent requests can be executed at the same time, thereby increasing the data throughput.

In some embodiments, method 300 further includes: receiving a unicast request from the user device through the user port of the switch, and sending the unicast request to the first ingress port of the first blockchain node or the second ingress port of the second blockchain node. For example, a unicast request may be received from user device 110 through user port 210 of switch 120, and the unicast request may be sent to first ingress port 220-1 of first blockchain node 240-1 or second ingress port 220-2 of second blockchain node 240-2.

In some embodiments, method 300 further includes: establishing a third blockchain node and a fourth blockchain node on a second switch different from a first switch, where the third blockchain node includes a third ingress port and a third egress port, and the fourth blockchain node includes a fourth ingress port and a fourth egress port. For example, the third blockchain node and the fourth blockchain node are established on second switch 120-2 different from first switch 120-1. The broadcast or multicast request is received from user device 110 through user port 210 of switch 120-1. The broadcast or multicast request is sent to first ingress port 220-1 of first blockchain node 240-1, second ingress port 220-2 of second blockchain node 240-2, the third ingress port of the third blockchain node, and the fourth ingress port of the fourth blockchain node.

It may be understood that the broadcast or multicast request may be encapsulated in a packet and sent to the blockchain system via any user port. The switch that receives the packet may parse the packet to obtain the broadcast or multicast request.

In some embodiments, the switch is a programmable switch, and the programmable switch is arranged between the user device and a cloud computing resource.

Figure 4:
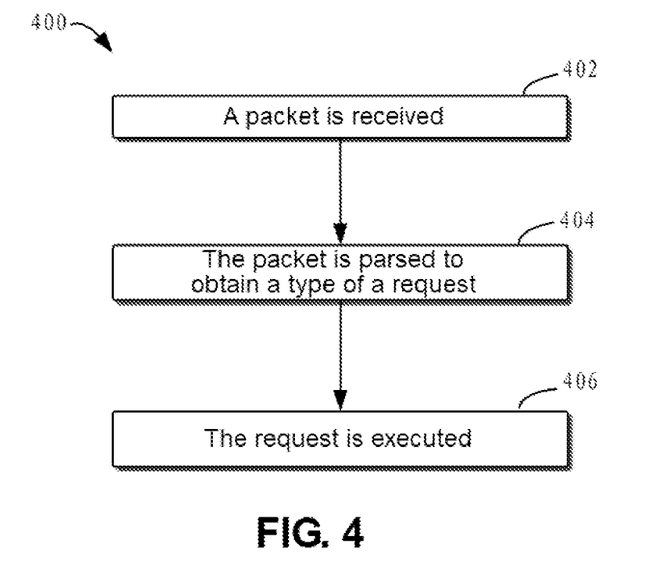
FIG. 4 is a flow chart illustrating obtaining a type of a request according to an example implementation of the present disclosure.

FIG. 4 shows a flow chart 400 of obtaining a type of a request according to an example implementation of the present disclosure.

At block 402, a packet is received. For example, a request is encapsulated in a packet and received via a user port. It may be understood that this means that the packet has been received by the blockchain system.

At block 404, the packet is parsed to obtain a type of the request. For example, the switch that receives the packet may parse the packet to obtain the type of the request.

In some embodiments, the type of the request includes an initialization request for initializing a configuration environment of the blockchain system. Additionally or alternatively, the type of the request may include a read request for reading data from the blockchain system, a write request for writing data from a user to the blockchain system, a join request for creating a new node to join the blockchain system, and/or a leave request for removing a blockchain node from the blockchain system.

At block 406, the request is executed. For example, if the obtained type of the request is the initialization request, a corresponding initialization request process is executed. For another example, if the obtained type of the request is the write request, a corresponding write request process is executed.

Figure 5A:
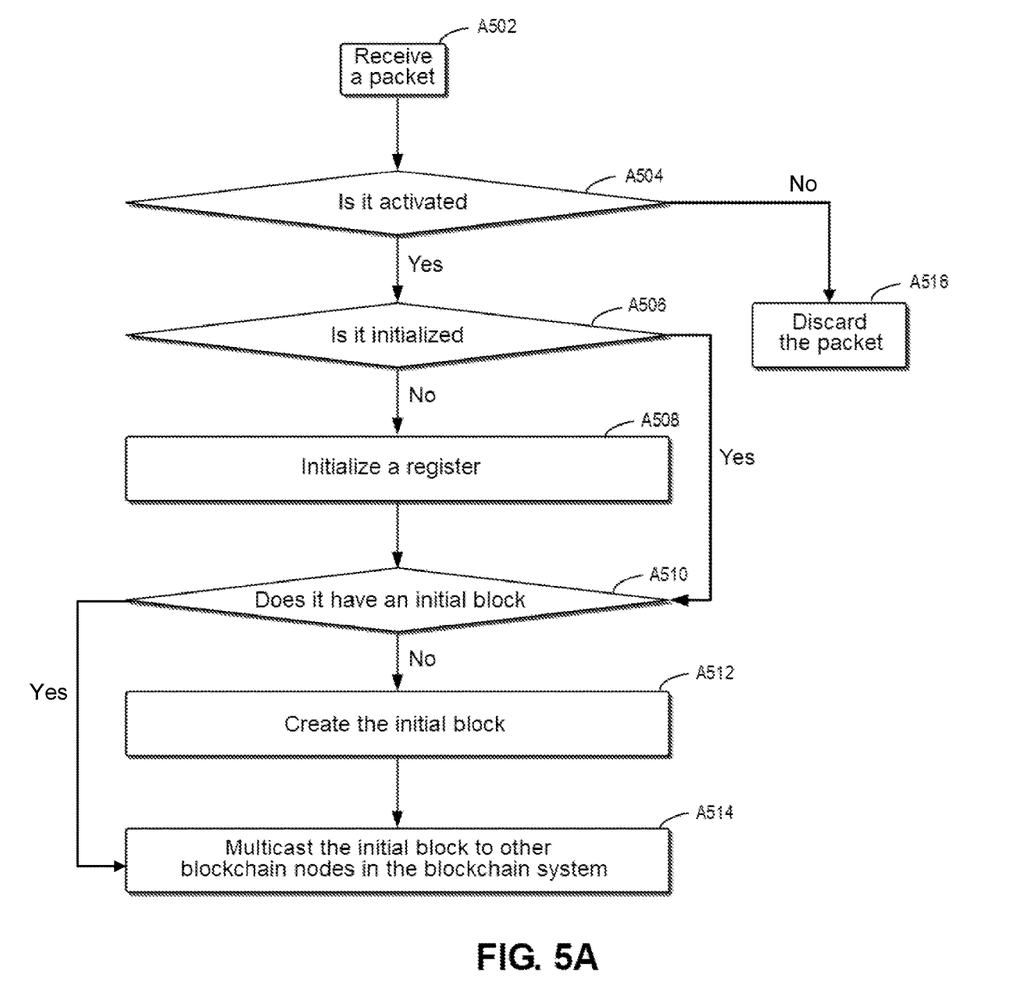
FIG. 5A is a flow chart illustrating execution of an initialization request according to an example implementation of the present disclosure.

FIG. 5A shows a flow chart of execution of an initialization request according to an example implementation of the present disclosure.

At block A502, a packet in which an initialization request is encapsulated is received. For example, the initialization request is encapsulated in a first packet, and is received by a switch via a user port.

At block A504, it is determined whether a requested particular blockchain node is activated. If the particular blockchain node is not activated, proceed to block A516, and the packet is discarded. If the particular blockchain node is activated, proceed to block A506.

At block A506, it is determined whether the particular blockchain node is initialized. If the particular blockchain node is not initialized, proceed to block A508. If the particular blockchain node is initialized, proceed to block A510.

At block A508, parameters in a register are initialized to initialize the blockchain node.

At block A510, it is determined whether the particular blockchain node has an initial block (a block numbered 0). The initial block, also referred to as a Genesis Block, is the first block of an entire blockchain and is numbered 0 (Block #0). A block header of each block refers to a hash value of a previous block. Therefore, when a blockchain system is born, the Genesis Block #0 has to be directly generated, and subsequent blocks can refer to its hash value into the block header. Then, blocks can be continuously generated in accordance with this rule and connected into a blockchain. If it is determined that the particular blockchain node does not have the initial block, proceed to block A512. If the particular blockchain node has the initial block, proceed to block A514.

At block A512, an initial block is created.

At block A514, the initial block is multicast to other blockchain nodes in the blockchain system.

Figure 5B:
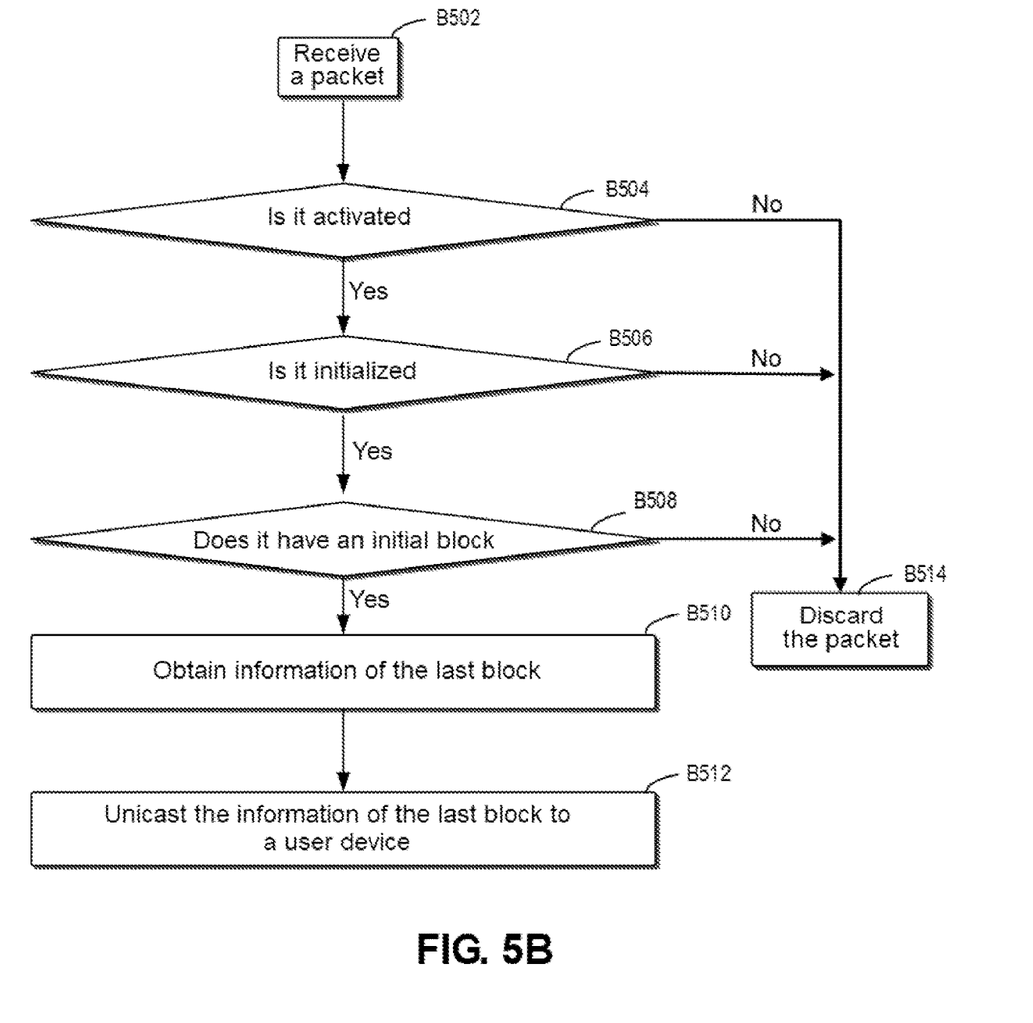
FIG. 5B is a flow chart illustrating execution of a read request according to an example implementation of the present disclosure.

FIG. 5B shows a flow chart of execution of a read request according to an example implementation of the present disclosure.

At block B502, a packet in which a read request is encapsulated is received. For example, the read request is encapsulated in a second packet, and is received by a switch via a user port.

At block B504, it is determined whether a requested particular blockchain node is activated. If the particular blockchain node is not activated, proceed to block B514, and the packet is discarded. If the particular blockchain node is activated, proceed to block B506.

At block B506, it is determined whether the particular blockchain node is initialized. If the particular blockchain node is not initialized, proceed to block B514. If the particular blockchain node is initialized, proceed to block B508.

At block B508, it is determined whether the particular blockchain node has an initial block. If it is determined that the particular blockchain node does not have the initial block, proceed to block B514. If the particular blockchain node has the initial block, proceed to block B510.

At block B510, information of the last block in the particular blockchain node is obtained.

At block B512, the information of the last block is unicast to the user device.

Figure 5C:
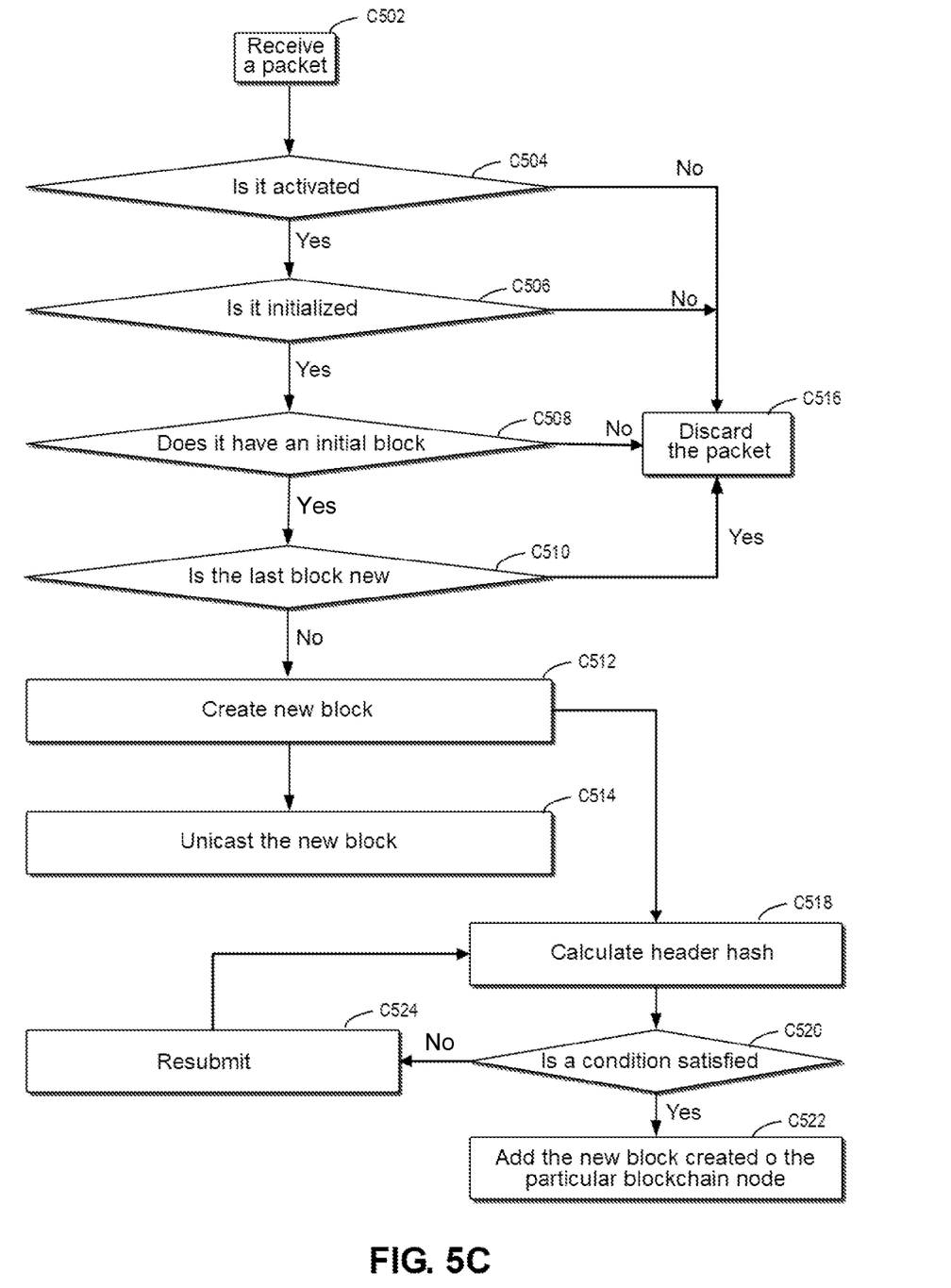
FIG. 5C is a flow chart illustrating execution of a write request according to an example implementation of the present disclosure.

FIG. 5C shows a flow chart of execution of a write request according to an example implementation of the present disclosure.

At block C502, a packet in which a write request is encapsulated is received. For example, the write request is encapsulated in a third packet, and is received by a switch via a user port.

At block C504, it is determined whether a requested particular blockchain node is activated. If the particular blockchain node is not activated, proceed to block C516, and the packet is discarded. If the particular blockchain node is activated, proceed to block C506.

At block C506, it is determined whether the particular blockchain node is initialized. If the particular blockchain node is not initialized, proceed to block C516. If the particular blockchain node is initialized, proceed to block C508.

At block C508, it is determined whether the particular blockchain node has an initial block. If it is determined that the particular blockchain node does not have the initial block, proceed to block C516. If the particular blockchain node has the initial block, proceed to block C510.

At block C510, it is determined whether the last block is new. If the last block is not new, proceed to block C512. If the last block is new, proceed to block C516.

At block C512, a new block is created. This portion of the process also includes sub-blocks C518, C520, C522, and C524.

At block C514, information of the new block is unicast to a user.

At sub-block C518, a header hash of the new block created is calculated. For example, a timestamp, a random number, and sha256 hash of a previous block are used.

At sub-block C520, it is determined whether the header hash satisfies a preselected condition, such as a condition on task difficulty. In an example, the condition on task difficulty may include that first N digits of the header hash should be 0.

If it is determined at sub-block C520 that the header hash satisfies the condition, the new block created is added to the particular blockchain node at sub-block C522.

If it is determined at sub-block C520 that the header hash does not satisfy the condition, a request of re-creating a new block is re-submitted to sub-block C518 at sub-block C524.

Figure 5D:
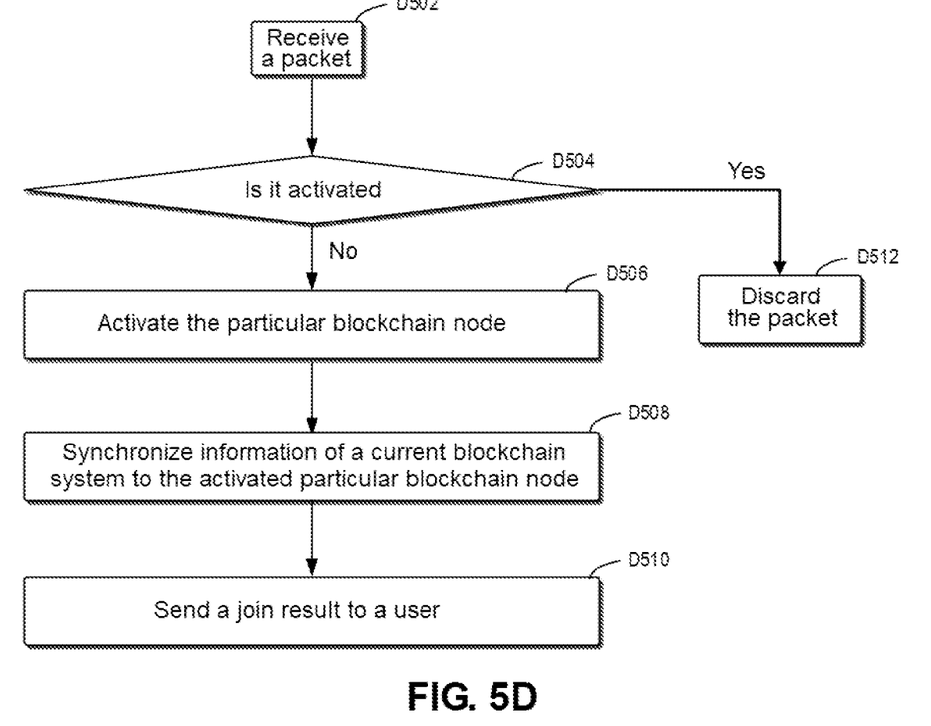
FIG. 5D is a flow chart illustrating execution of a join request according to an example implementation of the present disclosure.

FIG. 5D shows a flow chart of execution of a join request according to an example implementation of the present disclosure.

At block D502, a packet in which a join request is encapsulated is received. For example, the join request is encapsulated in a fourth packet, and is received by a switch via a user port.

At block D504, it is determined whether a requested particular blockchain node is activated. If the particular blockchain node is activated, proceed to block D512, and the packet is discarded. If the particular blockchain node is not activated, proceed to block D506.

At block D506, the particular blockchain node is activated.

At block D508, information of a current blockchain system is synchronized to the activated particular blockchain node.

At block D510, a join result is sent to a user.

Figure 5E:
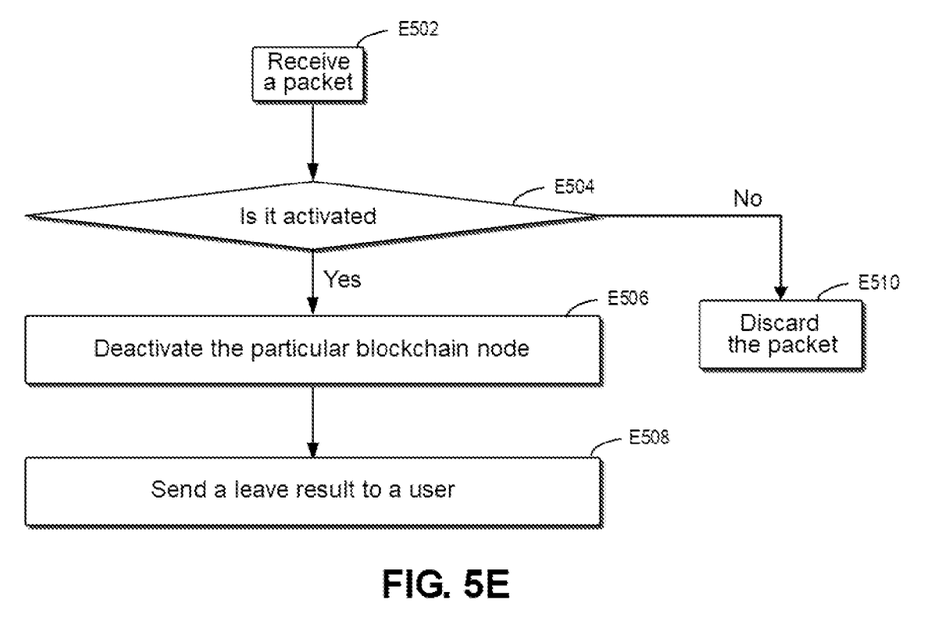
FIG. 5E is a flow chart illustrating execution of a leave request according to an example implementation of the present disclosure.

FIG. 5E shows a flow chart of execution of a leave request according to an example implementation of the present disclosure.

At block E502, a packet in which a leave request is encapsulated is received. For example, the leave request is encapsulated in a fifth packet, and is received by a switch via a user port.

At block E504, it is determined whether a requested particular blockchain node is activated. If the particular blockchain node is activated, proceed to block E506. If the particular blockchain node is not activated, proceed to block E510, and the packet is discarded.

At block E506, the particular blockchain node is deactivated.

At block E508, a leave result is sent to a user.

Figure 6:
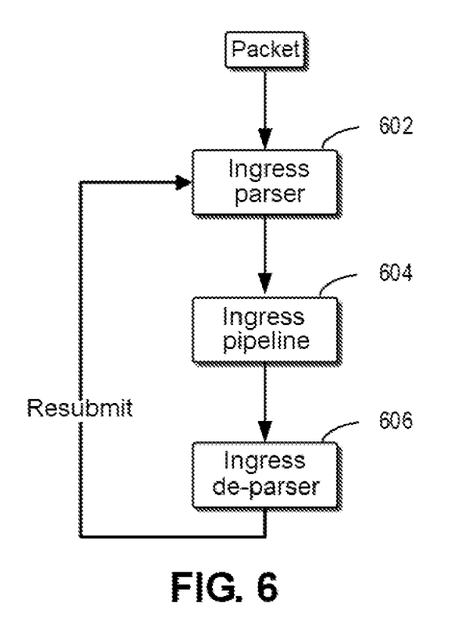
FIG. 6 is a schematic diagram illustrating a proof of work according to an example implementation of the present disclosure.

FIG. 6 shows a schematic diagram of a proof of work according to an example implementation of the present disclosure.

As shown in FIG. 6, in order to achieve a proof of work function of a blockchain system on a switch, a request for creating a new block may be repeatedly submitted in a case where a header hash does not satisfy task difficulty. In an example, the process may be implemented by programming the switch with a resubmit ( ) function in a p4 language.

At block 602, a packet is parsed by an ingress parser of the switch to obtain block information and message information.

At block 604, a block header hash is calculated and verified by an ingress pipeline of the switch.

At block 606, original packet data and retained parameter values may be resubmitted by an ingress de-parser to the ingress parser. It is also possible to add blocks to a list, add a count of the blocks, and provide a proof of work register in the ingress de-parser.

With the method of embodiments of the present disclosure, a blockchain system can be implemented on a switch instead of in the cloud. Therefore, the latency of data transmission between a user device and the cloud can be reduced. In addition, because calculations can be performed on the switch, transaction data does not need to be transferred, which further reduces the time required by the data transmission. As there are fewer computing tasks in the cloud, computing resources in the cloud can be released for other tasks. A network protocol can also be parsed directly on the switch, without the involvement of a cloud server, which releases the computing resources in the cloud.

Figure 7:
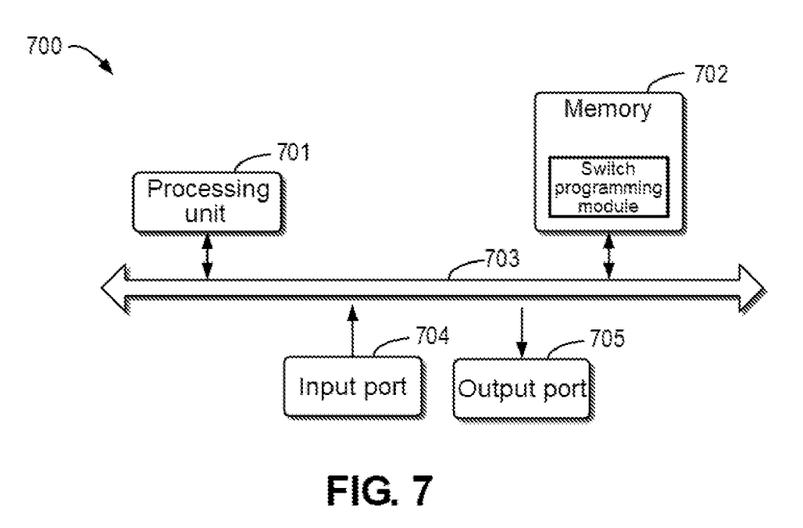
FIG. 7 is a block diagram of a device for implementing a blockchain system on a switch according to an example implementation of the present disclosure.

FIG. 7 illustrates a schematic block diagram of device 700 that may be used to implement embodiments of the present disclosure. Device 700 may be a device or apparatus as described in embodiments of the present disclosure. As shown FIG. 7, device 700 includes central processing unit (CPU) 701, which may execute various appropriate actions and processing in accordance with computer program instructions stored in memory 702. The memory 702 may comprise a random access memory (RAM) and/or a read-only memory (ROM). In the memory 702, various programs and data required by the operation of device 700 can also be configured, for example, by programming a switch programming module. Processing unit 701 and memory 702 are connected to each other by bus 703. Input port 704 and output port 705 are also connected to bus 703. Although not shown in FIG. 7, device 700 may also include a co-processor.

The various methods or processes described above may be performed by processing unit 701. For example, in some embodiments, one or more methods or processes may be implemented as a computer software program that is tangibly included in a machine-readable medium, such as a storage apparatus (not shown). In some embodiments, part or all of the computer program may be loaded and/or installed onto device 700. When the computer program is loaded into memory 702 and executed by processing unit 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or the technical improvements to technologies on the market, so as to enable persons of ordinary skill in the art to understand the embodiments disclosed herein.

Although the present disclosure has been described using a language specific to structural features and/or methodological actions, it should be understood that the subject matter defined in the appended claims is not necessarily limited to the particular features or actions described above. Rather, the specific features and actions described above are merely example forms of implementing the claims.

What is claimed is:

1. A method for implementing a blockchain system on a switch, the method comprising:
   establishing a first blockchain node and a second blockchain node on the switch, wherein the first blockchain node comprises a first ingress port and a first egress port, and the second blockchain node comprises a second ingress port and a second egress port;

receiving a broadcast or multicast request from a user device through a user port of the switch; and sending the broadcast or multicast request to the first ingress port of the first blockchain node and the second ingress port of the second blockchain node;

wherein the first ingress port and the second ingress port comprise respective distinct input ports of the switch;

wherein the first egress port and the second egress port comprise respective distinct output ports of the switch;

wherein the first and second blockchain nodes comprise respective blockchain nodes of the blockchain system implemented on the switch; and wherein the switch is configured to execute a plurality of different processes to control the blockchain system implemented on the switch, the plurality of different processes comprising at least one of a join process to add an additional blockchain node to the blockchain system implemented on the switch and a leave process to remove an existing blockchain node from the blockchain system implemented on the switch.

2. The method according to claim 1, further comprising:
receiving a unicast request from the user device through the user port of the switch; and
sending the unicast request to the first ingress port of the first blockchain node or the second ingress port of the second blockchain node.

3. The method according to claim 1, wherein the switch is a first switch, and the method further comprises:
receiving the broadcast or multicast request from the user device through the user port of the first switch; and
sending the broadcast or multicast request to the first ingress port of the first blockchain node, the second ingress port of the second blockchain node, a third ingress port of a third blockchain node established on a second switch, and a fourth ingress port of a fourth blockchain node established on the second switch.

4. The method according to claim 1, wherein a type of the broadcast or multicast request comprises at least one of:
an initialization request for initializing a configuration environment of the blockchain system;
a read request for reading data from the blockchain system;
a write request for writing data from a user to the blockchain system;
a join request for creating a new node to join the blockchain system; and
a leave request for removing a blockchain node from the blockchain system.

5. The method according to claim 4, further comprising:
in response to receiving the initialization request from the user device:
determining whether a particular blockchain node in the blockchain system is activated, wherein the particular blockchain node is specified by the initialization request;
determining whether the particular blockchain node has an initial block responsive to determining that the particular blockchain node is activated;
multicasting the initial block to other blockchain nodes in the blockchain system responsive to determining that the particular blockchain node has the initial block; or
creating the initial block and multicasting the created initial block to the other blockchain nodes in the blockchain system responsive to determining that the particular blockchain node does not have the initial block.

6. The method according to claim 4, further comprising:
in response to receiving the write request from the user device:
determining whether a particular blockchain node in the blockchain system is activated, wherein the particular blockchain node is specified by the write request;
determining whether the particular blockchain node is initialized responsive to determining that the particular blockchain node is activated;
determining whether the particular blockchain node has an initial block responsive to determining that the particular blockchain node is initialized;
determining whether the last block in the particular blockchain node is new responsive to determining that the particular blockchain node has the initial block;
obtaining information of the last block from the particular blockchain node responsive to determining that the last block in the particular blockchain node is not new;
creating a new block based on the obtained information of the last block;
calculating a header hash of the new block;
adding the new block to the blockchain node if the header hash satisfies a pre-determined condition.

7. The method according to claim 1, wherein the switch is a programmable switch, and the programmable switch is arranged between the user device and a cloud computing resource.

8. A switch, comprising:
a processing unit; and
a memory coupled to the processing unit and storing instructions, wherein the instructions, when executed by the processing unit, cause the switch to perform the following actions:
establishing a first blockchain node and a second blockchain node of a blockchain system implemented on the switch, wherein the first blockchain node comprises a first ingress port and a first egress port, and the second blockchain node comprises a second ingress port and a second egress port;
receiving a broadcast or multicast request from a user device through a user port of the switch; and
sending the broadcast or multicast request to the first ingress port of the first blockchain node and the second ingress port of the second blockchain node;
wherein the first ingress port and the second ingress port comprise respective distinct input ports of the switch;
wherein the first egress port and the second egress port comprise respective distinct output ports of the switch;
wherein the first and second blockchain nodes comprise respective blockchain nodes of the blockchain system implemented on the switch; and
wherein the switch is configured to execute a plurality of different processes to control the blockchain system implemented on the switch, the plurality of different processes comprising at least one of a join process to add an additional blockchain node to the blockchain system implemented on the switch and a leave process to remove an existing blockchain node from the blockchain system implemented on the switch.

9. The switch according to claim 8, wherein the actions further comprise:
receiving a unicast request from the user device through the user port of the switch; and
sending the unicast request to the first ingress port of the first blockchain node or the second ingress port of the second blockchain node.

10. The switch according to claim 8, wherein the switch is a first switch, and the actions further comprise:
- receiving the broadcast or multicast request from the user device through the user port of the first switch; and
- sending the broadcast or multicast request to the first ingress port of the first blockchain node, the second ingress port of the second blockchain node, a third ingress port of a third blockchain node established on a second switch, and a fourth ingress port of a fourth blockchain node established on the second switch.

11. The switch according to claim 8, wherein a type of the broadcast or multicast request comprises at least one of:
- an initialization request for initializing a configuration environment of a blockchain system;
- a read request for reading data from the blockchain system;
- a write request for writing data from a user to the blockchain system;
- a join request for creating a new node to join the blockchain system; and
- a leave request for removing a blockchain node from the blockchain system.

12. The switch according to claim 11, wherein the actions further comprise:
- in response to receiving the initialization request from the user device:
- determining whether a particular blockchain node in the blockchain system is activated, wherein the particular blockchain node is specified by the initialization request;
- determining whether the particular blockchain node has an initial block responsive to determining that the particular blockchain node is activated;
- multicasting the initial block to other blockchain nodes in the blockchain system responsive to determining that the particular blockchain node has the initial block; or
- creating the initial block and multicasting the created initial block to the other blockchain nodes in the blockchain system responsive to determining that the particular blockchain node does not have the initial block.

13. The switch according to claim 11, wherein the actions further comprise:
- in response to receiving the write request from the user device:
- determining whether a particular blockchain node in the blockchain system is activated, wherein the particular blockchain node is specified by the write request;
- determining whether the particular blockchain node is initialized responsive to determining that the particular blockchain node is activated;
- determining whether the particular blockchain node has an initial block responsive to determining that the particular blockchain node is initialized;
- determining whether the last block in the particular blockchain node is new responsive to determining that the particular blockchain node has the initial block;
- obtaining information of the last block from the particular blockchain node responsive to determining that the last block in the particular blockchain node is not new;
- creating a new block based on the obtained information of the last block;
- calculating a header hash of the new block;
- adding the new block to the blockchain node if the header hash satisfies a pre-determined condition.

14. The switch according to claim 8, wherein the switch is a programmable switch, and the programmable switch is arranged between the user device and a cloud computing resource.

15. A computer program product tangibly stored on a non-transitory computer-readable medium and comprising computer-executable instructions that, when executed by a device, cause the device to perform a method for implementing a blockchain system on a switch, the method comprising:
- establishing a first blockchain node and a second blockchain node on the switch, wherein the first blockchain node comprises a first ingress port and a first egress port, and the second blockchain node comprises a second ingress port and a second egress port;
- receiving a broadcast or multicast request from a user device through a user port of the switch; and
- sending the broadcast or multicast request to the first ingress port of the first blockchain node and the second ingress port of the second blockchain node;
- wherein the first ingress port and the second ingress port comprise respective distinct input ports of the switch;
- wherein the first egress port and the second egress port comprise respective distinct output ports of the switch;
- wherein the first and second blockchain nodes comprise respective blockchain nodes of the blockchain system implemented on the switch; and
- wherein the switch is configured to execute a plurality of different processes to control the blockchain system implemented on the switch, the plurality of different processes comprising at least one of a join process to add an additional blockchain node to the blockchain system implemented on the switch and a leave process to remove an existing blockchain node from the blockchain system implemented on the switch.

16. The computer program product according to claim 15, wherein the method further comprises:
- receiving a unicast request from the user device through the user port of the switch; and
- sending the unicast request to the first ingress port of the first blockchain node or the second ingress port of the second blockchain node.

17. The computer program product according to claim 15, wherein the switch is a first switch, and the method further comprises:
- receiving the broadcast or multicast request from the user device through the user port of the first switch; and
- sending the broadcast or multicast request to the first ingress port of the first blockchain node, the second ingress port of the second blockchain node, a third ingress port of a third blockchain node established on a second switch, and a fourth ingress port of a fourth blockchain node established on the second switch.

18. The computer program product according to claim 15, wherein a type of the broadcast or multicast request comprises at least one of:
- an initialization request for initializing a configuration environment of the blockchain system;
- a read request for reading data from the blockchain system;
- a write request for writing data from a user to the blockchain system;
- a join request for creating a new node to join the blockchain system; and
- a leave request for removing a blockchain node from the blockchain system.

19. The computer program product according to claim 18, wherein the method further comprises:
in response to receiving the initialization request from the user device:
determining whether a particular blockchain node in the blockchain system is activated, wherein the particular blockchain node is specified by the initialization request;
determining whether the particular blockchain node has an initial block responsive to determining that the particular blockchain node is activated;
multicasting the initial block to other blockchain nodes in the blockchain system responsive to determining that the particular blockchain node has the initial block; or
creating the initial block and multicasting the created initial block to the other blockchain nodes in the blockchain system responsive to determining that the particular blockchain node does not have the initial block.

20. The computer program product according to claim 18, wherein the method further comprises:
in response to receiving the write request from the user device:
determining whether a particular blockchain node in the blockchain system is activated, wherein the particular blockchain node is specified by the write request;
determining whether the particular blockchain node is initialized responsive to determining that the particular blockchain node is activated;
determining whether the particular blockchain node has an initial block responsive to determining that the particular blockchain node is initialized;
determining whether the last block in the particular blockchain node is new responsive to determining that the particular blockchain node has the initial block;
obtaining information of the last block from the particular blockchain node responsive to determining that the last block in the particular blockchain node is not new;
creating a new block based on the obtained information of the last block;
calculating a header hash of the new block;
adding the new block to the blockchain node if the header hash satisfies a pre-determined condition.

* * * * *